(12) United States Patent
Takegami et al.

(10) Patent No.: US 7,765,817 B2
(45) Date of Patent: Aug. 3, 2010

(54) REFRIGERATION SYSTEM

(75) Inventors: Masaaki Takegami, Osaka (JP); Satoru Sakae, Osaka (JP); Kenji Tanimoto, Osaka (JP)

(73) Assignee: Daiken Industries, Ltd., Osaka (JP)

( * ) Notice: Subject to any disclaimer, the term of this patent is extended or adjusted under 35 U.S.C. 154(b) by 524 days.

(21) Appl. No.: 11/631,859

(22) PCT Filed: Nov. 21, 2005

(86) PCT No.: PCT/JP2005/021379
§ 371 (c)(1),
(2), (4) Date: Jan. 8, 2007

(87) PCT Pub. No.: WO2006/057224
PCT Pub. Date: Jun. 1, 2006

(65) Prior Publication Data
US 2008/0034765 A1 Feb. 14, 2008

(30) Foreign Application Priority Data
Nov. 25, 2004 (JP) .............................. 2004-340582

(51) Int. Cl.
*F25B 49/00* (2006.01)
(52) U.S. Cl. ........................... 62/175; 62/228.3; 62/510
(58) Field of Classification Search ................ 62/228.3, 62/175, 510, 228.5
See application file for complete search history.

(56) References Cited

U.S. PATENT DOCUMENTS

| 4,184,341 A * | 1/1980 | Friedman | 62/175 |
| 4,537,038 A * | 8/1985 | Alsenz et al. | 62/118 |
| 4,831,832 A * | 5/1989 | Alsenz | 62/117 |
| 4,951,475 A * | 8/1990 | Alsenz | 62/117 |
| 4,966,013 A * | 10/1990 | Wood | 62/193 |
| 5,050,397 A * | 9/1991 | Sugiyama et al. | 62/175 |
| 5,689,963 A * | 11/1997 | Bahel et al. | 62/129 |
| 6,237,681 B1 * | 5/2001 | Takano et al. | 165/241 |
| 6,474,085 B2 * | 11/2002 | Uno et al. | 62/175 |
| 6,578,374 B2 * | 6/2003 | Singh et al. | 62/200 |
| 7,237,405 B2 * | 7/2007 | Takegami et al. | 62/498 |
| 2004/0093893 A1 * | 5/2004 | Tanimoto et al. | 62/510 |
| 2004/0112082 A1 * | 6/2004 | Tanimoto et al. | 62/510 |
| 2005/0115271 A1 | 6/2005 | Takegami et al. | |

FOREIGN PATENT DOCUMENTS

JP 6-50642 A 2/1994
JP 2004-44921 A 2/2004

* cited by examiner

*Primary Examiner*—Marc E Norman
(74) *Attorney, Agent, or Firm*—Birch, Stewart, Kolasch & Birch, LLP.

(57) ABSTRACT

In a refrigeration system, a first non-inverter compressor (2B) backs up one of an inverter compressor (2A) and a second non-inverter compressor (2C) by switching of a third four-way selector valve (3C). The refrigeration system includes: a suction pressure detection section (81) for detecting the suction pressure of the first non-inverter compressor (2B) after the issue of a switching command to the third four-way selector valve (3C); a command holding section (82) for, when the detected pressure of the suction pressure detection section (81) becomes lower than a predetermined value, determining that the third four-way selector valve (3C) has malfunctioned and holding the switching command; and a compressor standby section (83) for, upon the command holding section (82) holding the switching command, stopping the first non-inverter compressor (2B) and putting it into standby for a predetermined time.

3 Claims, 7 Drawing Sheets

REFRIGERATION SYSTEM

TECHNICAL FIELD

This invention relates to refrigeration systems and particularly relates to controlling the switching of a four-way selector valve in order to change the combination of compressors used from among three compressors.

BACKGROUND ART

Conventional refrigeration systems are known which include a plurality of utilization side heat exchangers in a plurality of circuit lines, respectively, (see, for example, Patent Document 1). The refrigeration system includes a refrigerant circuit in which a compression mechanism, a heat-source side heat exchanger and utilization side heat exchangers included in two circuit lines are connected to operate in a refrigeration cycle. The two circuit lines including the utilization side heat exchangers are composed of: a first system including a chilling heat exchanger and a freezing heat exchanger both for cooling storage cases; and a second system including an indoor heat exchanger for cooling and heating a room. The compression mechanism is composed of a first compressor exclusive to the first system, a third compressor exclusive to the second system and a second compressor for backing up the first or second system.

The compression mechanism is connected at the suction side to a four-way selector valve. Specifically, this four-way selector valve has a first port connected to a branch pipe branched from a suction pipe for the first compressor, a second port connected to a suction pipe for the second compressor, a third port connected to a branch pipe branched from a suction pipe for the third compressor, and a fourth port connected to the discharge side of the compressor mechanism. The four-way selector valve is configured to be switchable between a first position in which the first and second ports are communicated with each other and the third and fourth ports are communicated with each other and a second position in which the first and fourth ports are communicated with each other and the second and third ports are communicated with each other. Thus, if the first system lacks the cooling capacity, the four-way selector valve switches to the first position whereby the second compressor is used for the first system to back up the first compressor. On the other hand, if the second system lacks the cooling/heating capacity, the four-way selector valve switches to the second position whereby the second compressor is used for the second system to back up the third compressor.

Patent Document 1: Published Japanese Patent Application No. 2004-44921

PROBLEMS TO BE SOLVED

The above-described known refrigeration system, however, has a problem that it has no means for determining whether the four-way selector valve has malfunctioned and, additionally, no consideration is made of measures against malfunction. Specifically, there is a problem that even if a switching command is issued to the four-way selector valve, the four-way selector valve may cause a malfunction such as slow switching movement of the valve element or stop on its way, and if such a malfunction is left as it is, the suction pressure of the second compressor may extremely drop and, in the worst case, the second compressor might be broken. Here, a description will be given below of a mechanism of occurrence of a malfunction in the four-way selector valve.

First, as shown in FIG. 2, the four-way selector valve has a cylindrical body (101) closed at both ends thereof by plugs (102, 103), respectively. The body (101) has its periphery provided with four short pipes serving as the above-mentioned four ports (P1-P4). Accommodated in the body (101) is a valve element (108) with pistons (105, 106). The valve inside defined by the body (101) and the plugs (102, 103) is partitioned by both the pistons (105, 106) into three rooms, i.e., a high pressure room (R1), a first working room (R2) and a second working room (R3). Through the sliding of the pistons (105, 106) in the body (101), the four-way selector valve switches between a first position (the position shown in the solid lines in FIG. 2) in which the valve element (108) makes the first port (P1) communicated with the second port (P2) and a second position (the position shown in the broken lines in FIG. 2) in which the valve element (108) makes the second port (P2) communicated with the third port (P3). Though not shown, the first working room (R2) and the second working room (R3) are each filled with low-pressure or high-pressure gas refrigerant.

In the branch pipe branched from the suction pipe for the first compressor, a check valve (7) is provided for allowing only a refrigerant flow toward the first port (P1). In the branch pipe branched from the suction pipe for the third compressor, a check valve (7) is provided for allowing only a refrigerant flow toward the third port (P3).

For example, when the four-way selector valve is in the first position, part of suction refrigerant for the first compressor, i.e., low-temperature and low-pressure gas refrigerant, flows into the first port (P1) and then into the second port (P2) and is then sucked into the second compressor. On the other hand, high-temperature and high-pressure gas refrigerant having flowed into the valve through the fourth port (P4) flows into the high pressure room (R1) and then into the third port (P3) but is then shut off by the check valve (7). In short, each check valve (7) prevents high-temperature and high-pressure gas refrigerant having flowed into the valve through the fourth port (P4) from flowing into the first or third compressor. Thus, high-temperature gas refrigerant having flowed into the high pressure room (R1) resides therein and may be cooled by low-temperature gas refrigerant flowing through the valve element (108) to partly condense and become liquid. Further, high-temperature gas refrigerant in the second working room (R3) may also be cooled by the same to partly condense and become liquid.

If, under these conditions, a switching command is issued to switch the four-way selector valve from the first position to the second position, the first working room (R2) is filled with high-pressure gas refrigerant to push the valve element (108) toward the third port (P3). Thus, gas refrigerant in the high pressure room (R1) and the second working room (R3) can easily flow out but liquid refrigerant in them is less likely to flow out than the gas refrigerant. The residence of the liquid refrigerant restrains the movements of the pistons (105, 106) and the valve element (108), which may cause a malfunction such as a stop of the valve element on the way. If the valve element (108) thus stops on the way toward the third port (P3), the flow passage in the first port (P1) becomes narrowed to decrease the amount of suction refrigerant flowing into the second compressor, which extremely drops the suction pressure. This phenomenon occur likewise when the four-way selector valve is switched from the second position to the first position.

The present invention has been made with the foregoing in mind and, therefore, its object is that a refrigerant system including a four-way selector valve for switching its positions in order to change the combination of compressors from among three compressors will have an ability to detect a malfunction of the four-way selector valve at least during the switching thereof.

DISCLOSURE OF THE INVENTION

Solutions taken in the present invention are as follows.

The first solution is directed to a refrigeration system comprising a refrigerant circuit (1E), including a four-way selector valve (3C) provided therein, for operating in a refrigeration cycle, the four-way selector valve (3C) having a fist port (P1) for allowing only suction refrigerant for a first compressor (2A) to flow thereinto, a second port (P2) for allowing only suction refrigerant to flow out thereof toward a second compressor (2B), a third port (P3) for allowing only suction refrigerant for a third compressor (2C) to flow thereinto, and a fourth port (P4) for allowing only discharge refrigerant from the first to third compressors (2A, . . . ) to flow thereinto.

Further, the four-way selector valve (3C) is configured to be switchable between a first position in which the first port (P1) is communicated with the second port (P2) and the third port (P3) is communicated with the fourth port (P4) and a second position in which the first port (P1) is communicated with the fourth port (P4) and the second port (P2) is communicated with the third port (P3). Furthermore, the refrigeration system further comprises determining means (80) for detecting the suction pressure of the second compressor (2B) during switching of the four-way selector valve (3C) and thereby determining whether the four-way selector valve (3C) has malfunctioned.

In the above solution, when the four-way selector valve (3C) switches to the first position, the second compressor (2B) functions as a backup compressor for the first compressor (2A). On the other hand, when the four-way selector valve (3C) switches to the second position, the second compressor (2B) functions as a backup compressor for the third compressor (2C).

Specifically, in the first position of the four-way selector valve (3C), part of the suction refrigerant for the first compressor (2A) flows through the first port (P1) and then the second port (P2) of the four-way selector valve (3C) and is then sucked into the second compressor (2B). Since the discharge refrigerant having flowed through the fourth port (P4) into the four-way selector valve (3C) cannot flow out of the third port (P3), it resides in the four-way selector valve (3C). On the other hand, in the second position of the four-way selector valve (3C), part of the suction refrigerant for the third compressor (2C) flows through the third port (P3) and then the second port (P2) of the four-way selector valve (3C) and is then sucked into the second compressor (2B). Since the discharge refrigerant having flowed through the fourth port (P4) into the four-way selector valve (3C) cannot flow out of the first port (P1), it resides in the four-way selector valve (3C). In either case, since the suction refrigerant flowing through the first port (P1) and then the second port (P2) or the suction refrigerant flowing through the third port (P3) and then the second port (P2) has a low temperature, part of the discharge refrigerant residing in the four-way selector valve (3C) is cooled by the low-temperature refrigerant to condense.

Therefore, even if a switching command is issued to the four-way selector valve (3C), there might occur a malfunction, such as stop of the valve element of the four-way selector valve (3C) on the way or slow movement thereof, owing to interference with its normal operation from the condensed refrigerant. If such a malfunction occurs, the flow rate of suction refrigerant into the second compressor (2B) will be decreased to drop the suction pressure. In the present invention, the determining means (80) detects the suction pressure and thereby determines whether the four-way selector valve (3C) has malfunctioned. In other words, the operating condition of the four-way selector valve (3C) during its switching can be recognized by the determining means (80).

The second solution is directed to the first solution, wherein the determining means (80) comprises: a suction pressure detection section (81) for detecting the suction pressure of the second compressor (2B) after the issue of a switching command to the four-way selector valve (3C); a command holding section (82) for, when the detected pressure of the suction pressure detection section (81) becomes lower than a predetermined value, determining that the four-way selector valve (3C) has malfunctioned and holding the switching command; and a compressor standby section (83) for, upon the command holding section (82) holding the switching command, stopping the second compressor (2B) and putting it into standby for a predetermined time.

In the above solution, when the suction pressure of the second compressor (2B) becomes lower than the predetermined value during switching of the four-way selector valve (3C), it is determined that the four-way selector valve (3C) has malfunctioned. When the four-way selector valve (3C) is determined to have malfunctioned, the switching command to the four-way selector valve (3C) is held so that the second compressor (2B) is stopped and put into standby. This avoids breakage or other defects of the second compressor (2B) due to extreme drop in the suction pressure and allows the four-way selector valve (3C) to gradually switches to a selected position. Therefore, the pressure condition for actuating the valve element is maintained in the four-way selector valve (3C) so that the valve element gradually moves by the maintained pressure.

The third solution is directed to the second solution, wherein the determining means (80) further comprises a compressor startup section (84) for starting up the second compressor (2B) put into standby for the predetermined time by the compressor standby section (83). Further, the compressor standby section (83) is configured, when the detected pressure of the suction pressure detection section (81) becomes lower than the predetermined value again during the startup according to the compressor startup section (84), to stop the second compressor (2B) and put it into standby for a period of time extended from the predetermined time.

In the above solution, since the second compressor (2B) starts up after standby, the pressure for actuating the valve element of the four-way selector valve (3C) increases. Thus, the valve element surely actuates so that the four-way selector valve (3C) switches. Further, if the suction pressure of the second compressor (2B) becomes lower than the predetermined value during startup thereof, the second compressor (2B) is stopped and put into standby for an extended standby time. Specifically, each time the suction pressure of the second compressor (2B) becomes lower than the predetermined value, the standby time for the second compressor (2B) is extended. Thus, the four-way selector valve (3C) surely switches during the standby time.

EFFECTS

According to the first solution, the suction pressure of the second compressor (2B) during switching of the four-way selector valve (3C) is detected and it is thereby determined whether the four-way selector valve (3C) has malfunctioned, which makes it possible to surely recognize the operating condition of the four-way selector valve (3C). Thus, suitable measures can be taken against malfunctions.

According to the second solution, as a measure against a malfunction, the switching command to the four-way selector valve (3C) is held and the second compressor (2B) is stopped and put into standby for the predetermined time. Therefore, the four-way selector valve (3C) can be gradually switched while the second compressor (2B) can be protected against extreme drop in the suction pressure. As a result, the system operation after switching of the four-way selector valve (3C) can be normally carried out.

According to the third solution, since the second compressor (2B) after standby is started up, the pressure for switching the four-way selector valve (3C) can be increased. Thus, even if the four-way selector valve (3C) has not been normally switched during standby of the second compressor (2B), it can be surely switched. Further, since the standby time for the second compressor (2B) is extended each time the suction pressure becomes lower than the predetermined value again and the four-way selector valve (3C) is determined to have malfunctioned, the four-way selector valve (3C) can be surely switched during the standby time.

Figure 1:
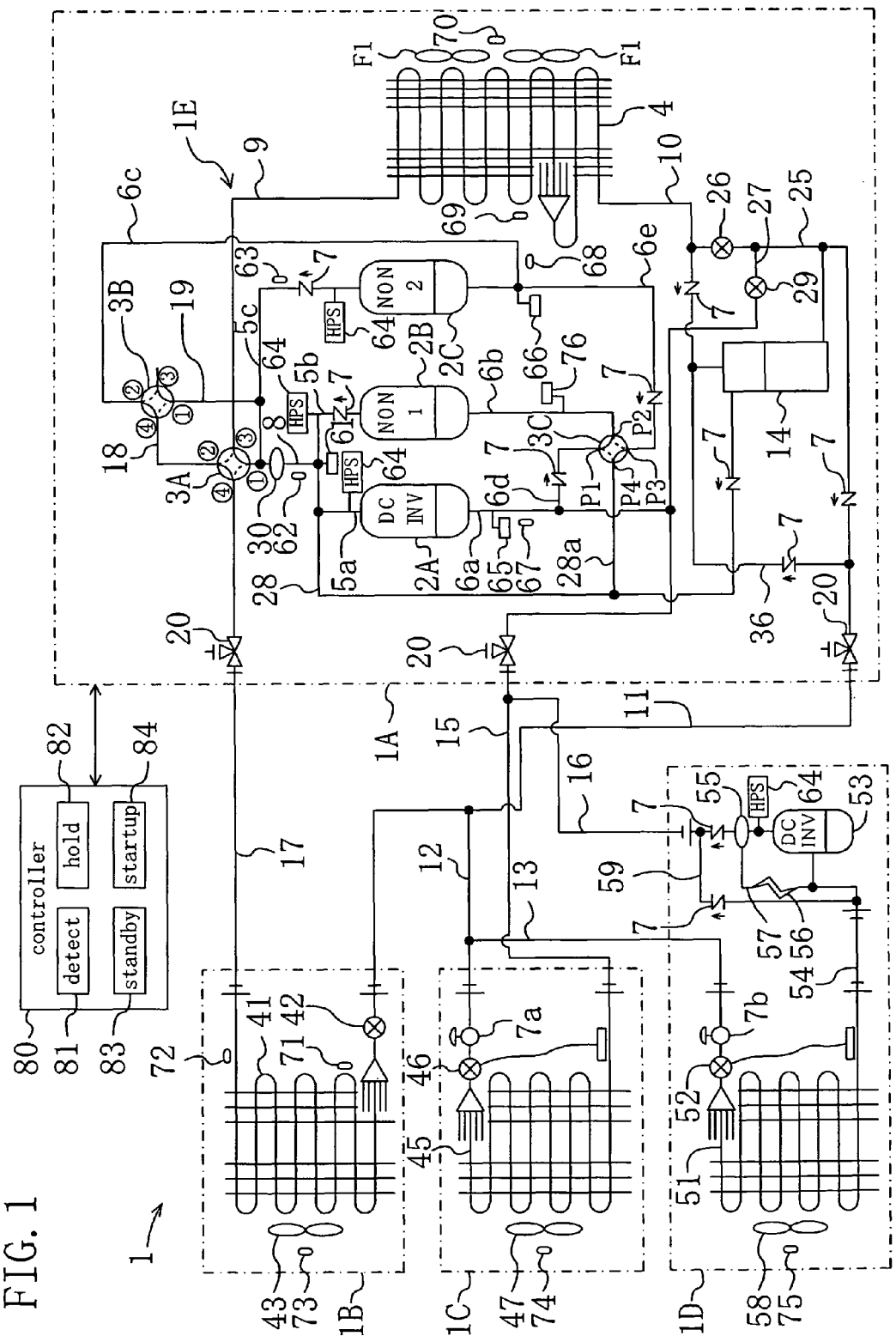
FIG. 1 is a piping diagram for a refrigeration system according to an embodiment.

EXPLANATION OF REFERENCE CHARACTERS 1 refrigeration system
1E refrigerant circuit
2A inverter compressor (first compressor)
2B first non-inverter compressor (second compressor)
2C second non-inverter compressor (third compressor)
3C third four-way selector valve (four-way selector valve)
P1-P4 first to fourth ports
80 controller (determining means)
81 suction pressure detection section
82 command holding section
83 compressor standby section
84 compressor startup section

BEST MODE FOR CARRYING OUT THE INVENTION

Embodiments of the present invention will be described below in detail with reference to the drawings.

As shown in FIG. 1, a refrigeration system (1) according to the present embodiment is a system installed in a convenience store for the purpose of cooling a cold storage display case and a freezer display case and cooling/heating the store.

The refrigeration system (1) comprises an outdoor unit (1A), an indoor unit (1B), a chilling unit (1C) and a freezing unit (1D) and includes a refrigerant circuit (1E) for operating in a vapor compression refrigeration cycle. The refrigerant circuit (1E) is formed so that a heat source system including the outdoor unit (1A) is connected with an air-conditioning system including the indoor unit (1B) and a cooling system including the chilling unit (1C) and the freezing unit (1D). Further, the refrigerant circuit (1E) is configured to switch between a cooling cycle and a heating cycle.

The indoor unit (1B) is placed, for example, in a selling space, to cool and heat the store. The chilling unit (1C) is placed in the cold storage display case to cool the air in the display case. The freezing unit (1D) is placed in the freezer display case to cool the air in the display case.

<Outdoor Unit>

The outdoor unit (1A) includes three compressors (2A, 2B, 2C) that are compression mechanisms, three four-way selector valves (3A, 3B, 3C) that are flow channel selectors, and an outdoor heat exchanger (4) that is a heat-source side heat exchanger.

The three compressors (2A, 2B, 2C) are an inverter compressor (2A) serving as a first compressor, a first non-inverter compressor (2B) serving as a second compressor, and a second non-inverter compressor (2C) serving as a third compressor. Each of these compressors is formed of a hermetic, high-pressure dome type scroll compressor. The inverter compressor (2A) is a variable capacity compressor in which a motor is controlled by an inverter to make the capacity stepwise or continuously variable. The first non-inverter compressor (2B) and second non-inverter compressor (2C) are fixed capacity compressors in which a motor is driven at a constant rotation number.

Discharge pipes (5a, 5b, 5c) for the inverter compressor (2A), the first non-inverter compressor (2B) and the second non-inverter compressor (2C) are connected to a common high-pressure gas pipe (8), and the high-pressure gas pipe (8) is connected to the first port of the first four-way selector valve (3A). The discharge pipe (5b) for the first non-inverter compressor (2B) and the discharge pipe (5c) for the second non-inverter compressor (2C) are provided with check valves (7), respectively. The high-pressure gas pipe (8) is provided with an oil separator (30).

The outdoor heat exchanger (4) is connected at one end, a gas-side end, through an outdoor gas pipe (9) to the third port of the first four-way selector valve (3A) and connected at the other end, a liquid-side end, to one end of an outdoor liquid pipe (10) that is a liquid line. The outdoor liquid pipe (10) includes a receiver (14) disposed partway therealong to store liquid refrigerant and is connected at the other end through a shut-off valve (20) to a connecting liquid pipe (11) disposed outside the outdoor unit (1A). The outdoor liquid pipe (10) also includes a check valve (7) disposed upstream of the receiver (14) to allow only a refrigerant flow toward the receiver (14) and a check valve (7) disposed downstream of the receiver (14) to allow only a refrigerant flow from the receiver (14) toward a shut-off valve (40).

The outdoor heat exchanger (4) is formed of, for example, a cross-fin type fin-and-tube heat exchanger. Disposed close to the outdoor heat exchanger (4) are two outdoor fans (F1) that are heat-source fans.

The fourth port of the first four-way selector valve (3A) is connected via a shut-off valve (20) to a first connecting gas pipe (17) disposed outside the outdoor unit (1A), and the second port thereof is connected through a connecting pipe (18) to the fourth port of the second four-way selector valve (3B). The first port of the second four-way selector valve (3B) is connected through an auxiliary gas pipe (19) to the discharge pipe (5c) for the second non-inverter compressor (2C).

The second port of the second four-way selector valve (3B) is connected to a suction pipe (6c) for the second non-inverter compressor (2C). The third port of the second four-way selector valve (3B) is a blocked port. Therefore, the second four-way selector valve (3B) may be replaced with a three-way selector valve having three ports.

The first four-way selector valve (3A) is configured to switch between a first position (the position shown in the solid lines in FIG. 1) in which the high-pressure gas pipe (8) is communicated with the outdoor gas pipe (9) and the connecting pipe (18) is communicated with the first connecting gas pipe (17) and a second position (the position shown in the broken lines in FIG. 1) in which the high-pressure gas pipe (8) is communicated with the first connecting gas pipe (17) and the connecting pipe (18) is communicated with the outdoor gas pipe (9). On the other hand, the second four-way selector valve (3B) is configured to switch between a first position (the position shown in the solid lines in FIG. 1) in which the auxiliary gas pipe (19) is communicated with the blocked port and the connecting pipe (18) is communicated with the suction pipe (6c) for the second non-inverter compressor (2C) and a second position (the position shown in the broken lines in FIG. 1) in which the auxiliary gas pipe (19) is communicated with the connecting pipe (18) and the suction pipe (6c) is communicated with the blocked port.

The outdoor liquid pipe (10) is connected to an auxiliary liquid pipe (25) that bypasses the receiver (14) and the check valve (7) upstream thereof. The auxiliary liquid pipe (25) is provided with an outdoor expansion valve (26) that is an expansion mechanism. The outdoor liquid pipe (10) is also connected to a liquid branch pipe (36) having a check valve (7). One end of the liquid branch pipe (36) is connected to the outdoor liquid pipe (10) between the receiver (14) and the check valve (7) upstream of the receiver (14) and the other end thereof is connected to the outdoor liquid pipe (10) between the check valve (7) and the shut-off valve (20) both downstream of the receiver (14). The check valve (7) in the liquid branch pipe (36) allows only a refrigerant flow toward the receiver (14).

Connected between the auxiliary liquid pipe (25) and a suction pipe (6a) for the inverter compressor (2A) is a liquid injection pipe (27) with an electronic expansion valve (29) that is an expansion mechanism. Connected between an upper part of the receiver (14) and the discharge pipe (5a) for the inverter compressor (2A) is a gas vent pipe (28) with a check valve (7). The check valve (7) of the gas vent pipe (28) is for allowing only a refrigerant flow from the receiver (14) toward the discharge pipe (5a).

The suction pipe (6a) for the inverter compressor (2A) is connected via a shut-off valve (20) to a second connecting gas pipe (15) disposed outside the outdoor unit (1A). A suction pipe (6b) for the first non-inverter compressor (2B) is connected to the third four-way selector valve (3C) according to the present invention and configured to be communicated with either the suction pipe (6a) for the inverter compressor (2A) or the suction pipe (6c) for the second non-inverter compressor (2C).

More specifically, the suction pipe (6a) for the inverter compressor (2A) is connected through a branch pipe (6d) to the first port (P1) of the third four-way selector valve (3C). The suction pipe (6b) for the first non-inverter compressor (2B) is connected to the second port (P2) of the third four-way selector valve (3C). The suction pipe (6c) for the second non-inverter compressor (2C) is connected through a branch pipe (6e) to the third port (P3) of the third four-way selector valve (3C). The fourth port (P4) of the third four-way selector valve (3C) is connected to a branch pipe (28a) branched from the gas vent pipe (28) downstream of the check valve (7). The branch pipes (6d, 6e) are provided with check valves (7), one for each branch pipe, and each check valve allows only a refrigerant flow toward the third four-way selector valve (3C). Specifically, in the third four-way selector valve (3C), the first port (P1) allows only suction refrigerant for the inverter compressor (2A) to flow thereinto, the second port (P2) allows only suction refrigerant to flow out thereof toward the first non-inverter compressor (2B), the third port (P3) allows only suction refrigerant for the second non-inverter compressor (2C) to flow thereinto, and the fourth port (P4) allows only discharge refrigerant from the inverter compressor (2A) and the first non-inverter compressor (2B) to flow thereinto.

The third four-way selector valve (3C) is configured to switch between a first position (the position shown in the solid lines in FIG. 1) in which the first port (P1) is communicated with the second port (P2) and the third port (P3) is communicated with the fourth port (P4) and a second position (the position shown in the broken lines in FIG. 1) in which the first port (P1) is communicated with the fourth port (P4) and the second port (P2) is communicated with the third port (P3). Thus, the inverter compressor (2A) is used solely for the cooling system while the second non-inverter compressor (2C) is used solely for the air-conditioning system. The first non-inverter compressor (2B) is used selectively for the cooling system and the air-conditioning system by the switching of the third four-way selector valve (3C) and constitutes a backup compressor for the inverter compressor (2A) and the second non-inverter compressor (2C).

Figure 2:
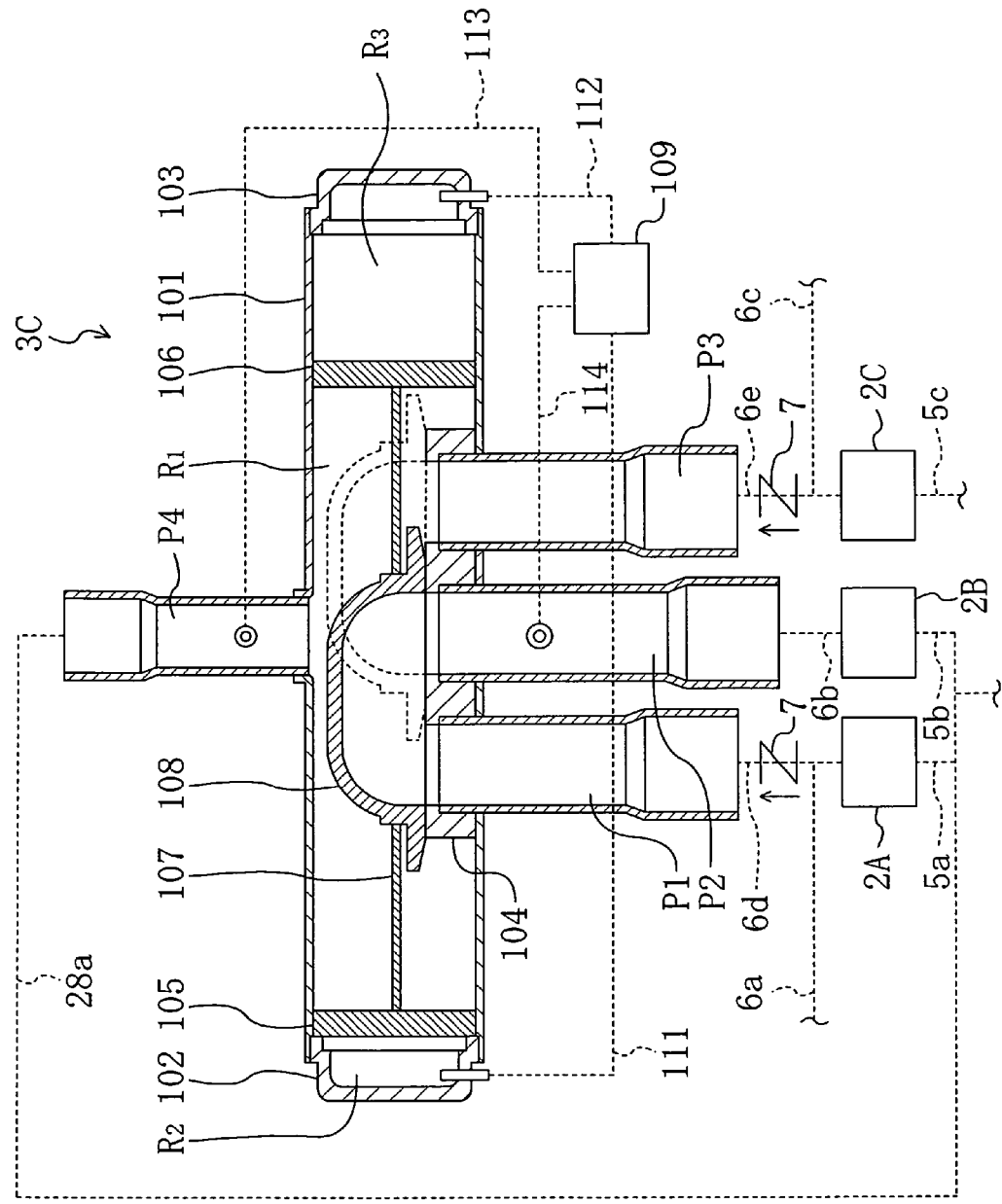
FIG. 2 is a diagram showing the structure of a third four-way selector valve.
Figure 3A:
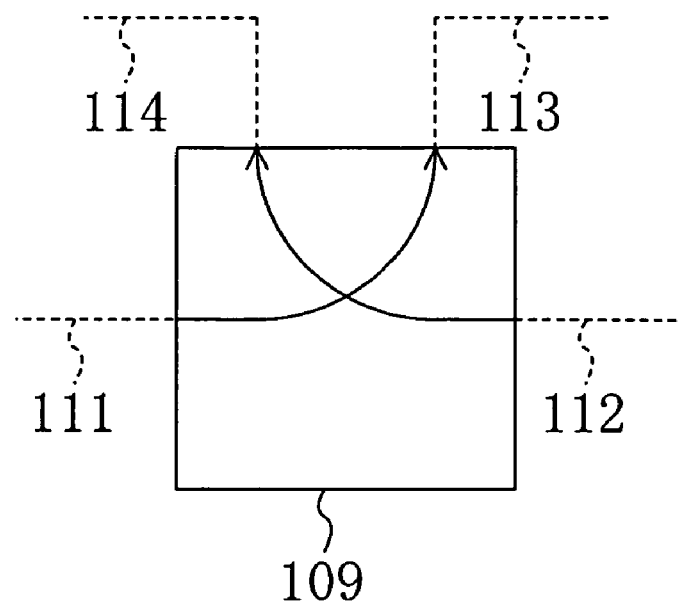
FIG. 3 is diagrams showing a pilot valve for the third four-way selector valve, wherein 3A illustrates a first position of the pilot valve and 3B illustrates a second position thereof.
Figure 3B:
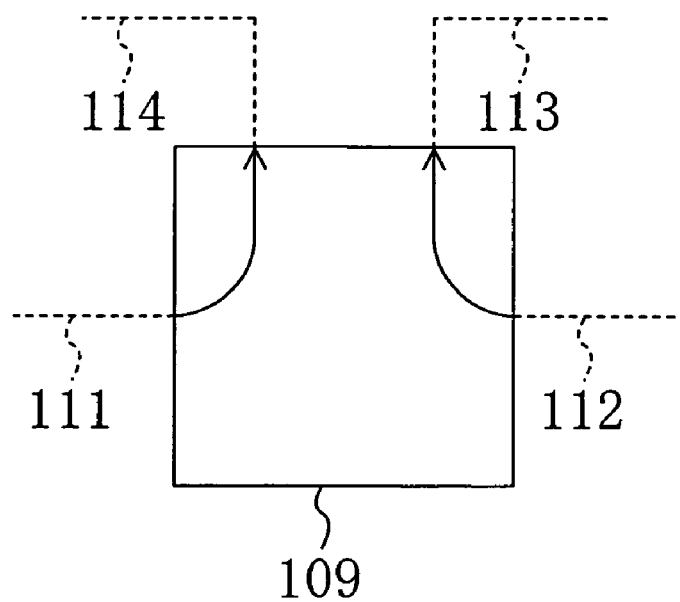

The structure of the third four-way selector valve (3C) is now described in detail with reference to FIGS. 2 and 3. Note that overlapped parts with that described in the above "Problems to Be Solved by the Invention" are omitted.

Accommodated in a body (101) of the third four-way selector valve (3C) are a cup-shaped valve element (108) and pistons (105, 106) integrally attached through a connecting plate (107) to both sides of the valve element (108). The body (101) has a valve seat (104) internally provided at a location corresponding to the openings of the first port (P1), the second port (P2) and the third port (P3) to allow the valve element (108) to seat thereon.

Further, the third four-way selector valve (3C) is provided with a pilot valve (109). The pilot valve (109) is connected to a first connecting tube (111) in communication with a first working room (R2), a second connecting tube (112) in communication with a second working room (R3), a third connecting tube (113) in communication with the fourth port (P4), and a fourth connecting tube (114) in communication with the second port (P2). The pilot valve (109) is configured to switch between a first position (the position shown in FIG. 3A) in which the first connecting tube (111) is communicated with the third connecting tube (113) and the second connecting tube (112) is communicated with the fourth connecting tube (114) and a second position (the position shown in FIG. 3B) in which the first connecting tube (111) is communicated with the fourth connecting tube (114) and the second connecting tube (112) is communicated with the third connecting tube (113).

Specifically, upon energization of the pilot valve (109) (ON), it switches to the first position so that the first working room (R2) is filled with high-pressure gas refrigerant coming from the fourth port (P4) and the second working room (R3) is filled with low-pressure gas refrigerant coming from the second port (P2). On the other hand, upon termination of energization of the pilot valve (109) (OFF), it switches to the second position so that the first working room (R2) is filled with low-pressure gas refrigerant coming from the second port (P2) and the second working room (R3) is filled with high-pressure gas refrigerant coming from the fourth port (P4). Thus, when the pilot valve (109) switches to the second position, the pressure difference between both the working rooms (R2, R3) causes the pistons (105, 106) to be pushed to the left as viewed in FIG. 2, thereby putting the third four-way selector valve (3C) into the first position (the position shown in the solid lines in FIG. 2) in which the valve element (108) makes the first port (P1) communicated with the second port (P2). On the other hand, when the pilot valve (109) switches to the first position, the pressure difference between both the working rooms (R2, R3) causes the pistons (105, 106) to be pushed to the right as viewed in FIG. 2, thereby putting the third four-way selector valve (3C) into the second position (the position shown in the broken lines in FIG. 2) in which the valve element (108) makes the second port (P2) communicated with the third port (P3).

In relation to the third four-way selector valve (3C), the check valves (7) downstream of the first port (P1) and the third port (P3) prevent discharge refrigerants having flowed from the inverter compressor (2A) and the first non-inverter compressor (2B) through the fourth port (P4) into the third four-way selector valve (3C) from being sucked into the inverter compressor (2A) and the second non-inverter compressor (2C), respectively.

<Indoor Unit>

The indoor unit (1B) includes an indoor heat exchanger (41) that is a utilization side heat exchanger and an indoor expansion valve (42) that is an expansion mechanism. The indoor heat exchanger (41) is connected at one end, a gas-side end, to the first connecting gas pipe (17) and connected at the other end, a liquid-side end, via the indoor expansion valve (42) to the connecting liquid pipe (11). The indoor heat exchanger (41) is, for example, a cross-fin type fin-and-tube heat exchanger. Disposed close to the indoor heat exchanger (41) is an indoor fan (43) that is a utilization side fan. The indoor expansion valve (42) is formed of a motor-operated expansion valve.

<Chilling Unit>

The chilling unit (1C) includes a chilling heat exchanger (45) that is a utilization side heat exchanger and a chilling expansion valve (46) that is an expansion mechanism. The chilling heat exchanger (45) is connected at one end, a liquid-side end, via the chilling expansion valve (46) and a solenoid valve (7a) in this order to a first branch liquid pipe (12) branched from the connecting liquid pipe (11) and connected at the other end, a gas-side end, to the second connecting gas pipe (15). The solenoid valve (7a) is used to shut off the refrigerant flow during thermo-off (downtime).

In the chilling heat exchanger (45), the refrigerant evaporation pressure is lower than the refrigerant evaporation pressure in the indoor heat exchanger (41). As a result, the refrigerant evaporation temperature in the chilling heat exchanger (45) is set at, for example, −10° C. and, on the other hand, the refrigerant evaporation temperature in the indoor heat exchanger (41) is set at, for example, +5° C. In this manner, the refrigerant circuit (1E) constitutes a circuit for evaporating refrigerant at different temperatures.

The chilling expansion valve (46) is a thermostatic expansion valve and its temperature-sensing bulb is mounted to the gas side of the chilling heat exchanger (45). Thus, the opening of the chilling expansion valve (46) is controlled based on the refrigerant temperature at the exit side of the chilling heat exchanger (45). The chilling heat exchanger (45) is, for example, a cross-fin type fin-and-tube heat exchanger. Disposed close to the chilling heat exchanger (45) is a chilling fan (47) that is a utilizations side fan.

<Freezing Unit>

The freezing unit (1D) includes a freezing heat exchanger (51) that is a utilization side heat exchanger, a freezing expansion valve (52) that is an expansion mechanism, and a booster compressor (53) that is a freezing compressor. The freezing heat exchanger (51) is connected at one end, a liquid-side end, via the freezing expansion valve (52) and a solenoid valve (7b) in this order to a second branch liquid pipe (13) branched from the first branch liquid pipe (12) and is connected at the other end, a gas-side end, through a connecting gas pipe (54) to the suction side of the booster compressor (53). The booster compressor (53) is connected at the discharge side to a branch gas pipe (16) branched from the second connecting gas pipe (15). The branch gas pipe (16) is provided with an oil separator (55) and a check valve (7) in order away from the booster compressor (53). The check valve (7) allows only a refrigerant flow from the booster compressor (53) toward the second connecting gas pipe (15). Connected between the oil separator (55) and the connecting gas pipe (54) is an oil return pipe (57) with a capillary tube (56).

The booster compressor (53), together with the compressors (2A, 2B, 2C) in the outdoor unit (1A), compresses refrigerant in two stages so that the refrigerant evaporation temperature in the freezing heat exchanger (51) becomes lower than that in the chilling heat exchanger (45). The refrigerant evaporation temperature in the freezing heat exchanger (51) is set at, for example, −35° C.

The freezing expansion valve (52) is a thermostatic expansion valve and its temperature-sensing bulb is mounted to the gas side of the freezing heat exchanger (51). The freezing heat exchanger (51) is, for example, a cross-fin type fin-and-tube heat exchanger. Disposed close to the freezing heat exchanger (51) is a freezing fan (58) that is a utilizations side fan.

Further, a bypass pipe (59) with a check valve (7) is connected between the connecting gas pipe (54) and part of the branch gas pipe (16) downstream of the check valve (7). The bypass pipe (59) is configured to allow refrigerant to bypass the booster compressor (53) and flow toward the branch gas pipe (16) during halt of the booster compressor (53) due to malfunction or the like.

<Control System>

The refrigerant circuit (1E) is provided with various sensors and various switches. The high-pressure gas pipe (8) in the outdoor unit (1A) is provided with a high-pressure sensor (61) that is a high-pressure sensing device for detecting the high pressure of refrigerant and a discharge temperature sensor (62) that is a temperature sensing device for detecting the discharge temperature of refrigerant. The discharge pipe (5c) for the second non-inverter compressor (2C) is provided with a discharge temperature sensor (63) that is a temperature sensing device for detecting the discharge temperature of high-pressure refrigerant. Each of the discharge pipes (5a, 5b, 5c) for the inverter compressor (2A), the first non-inverter compressor (2B) and the second non-inverter compressor (2C) is provided with a pressure switch (64) that opens when the high pressure of refrigerant reaches a predetermined value.

The suction pipes (6a, 6c) for the inverter compressor (2A) and the second non-inverter compressor (2C) are provided with low-pressure sensors (65, 66), respectively, that are pressure sensing devices for detecting the pressure of suction refrigerant and also provided with suction temperature sensors (67, 68), respectively, that are temperature sensing devices for detecting the suction temperature of refrigerant. Further, as a feature of the present invention, the suction pipe (6b) for the first non-inverter compressor (2B) is also provided with a low-pressure sensor (76) that is a pressure sensing device for detecting the pressure of suction refrigerant.

The outdoor heat exchanger (4) is provided with an outdoor heat exchange sensor (69) that is a temperature sensing device for detecting the evaporation temperature or the condensation temperature of refrigerant. In addition, the outdoor unit (1A) is provided with an outdoor air temperature sensor (70) that is a temperature sensing device for detecting the outdoor air temperature.

The indoor heat exchanger (41) is provided with an indoor heat exchange sensor (71) that is a temperature sensing device for detecting the condensation temperature or the evaporation temperature of refrigerant and also provided at its gas side with a gas temperature sensor (72) that is a temperature sensing device for detecting the gas refrigerant temperature. In addition, the indoor unit (1B) is provided with a room temperature sensor (73) that is a temperature sensing device for detecting the room air temperature.

The chilling unit (1C) is provided with a chilling temperature sensor (74) that is a temperature sensing device for detecting the temperature in the cold-storage display case. The freezing unit (1D) is provided with a freezing temperature sensor (75) that is a temperature sensing device for detecting the temperature in the freezer display case. The booster compressor (53) is provided at the discharge side with a pressure switch (64) that opens when the discharge pressure of refrigerant reaches a predetermined value.

The refrigeration system (1) includes a controller (80). The controller (80) controls the openings of the outdoor expansion valve (26) and the indoor expansion valve (42), selects ports of each four-way selector valve (3A, 3B, 3C) and, as a feature of the present invention, constitutes a determining means for determining whether the third four-way selector valve (3C) has malfunctioned and controlling port selection accordingly.

The controller (80) includes a suction pressure detection section (81), a command holding section (82), a compressor standby section (83) and a compressor startup section (84).

The suction pressure detection section (81) receives as an input a detected pressure of the low-pressure sensor (76) for the first non-inverter compressor (2B) upon switching of the third four-way selector valve (3C). In other words, the suction pressure detection section (81) is configured to detect the suction pressure of the first non-inverter compressor (2B) after the issue of a switching command to the third four-way selector valve (3C).

The command holding section (82) is configured so that when the detected pressure of the suction pressure detection section (81) continues to be lower than a predetermined value for a predetermined time T1 (for example, ten seconds), it determines that the third four-way selector valve (3C) has malfunctioned and holds the switching command to the third four-way selector valve (3C). In other words, for example, in the case of a switching command to switch the third four-way selector valve (3C) from the first position to the second position, the command holding section (82) holds the pilot valve (109) in the first position that is an energized position (ON position).

The compressor standby section (83) is configured so that when the command holding section (82) holds the switching command, it stops the first non-inverter compressor (2B) and puts the first non-inverter compressor (2B) into standby for a predetermined time T2 (for example, five minutes) that is a standby time.

The compressor startup section (84) is configured to start up the first non-inverter compressor (2B) put into standby for the predetermined time T2. Further, upon startup of the first non-inverter compressor (2B), if the detected pressure of the suction pressure detection section (81) continues to be lower than the predetermined value for the predetermined time T1 again, the compressor standby section (83) stops the first non-inverter compressor (2B) again and puts it into standby for a period of time extended from the predetermined time T2 (i.e., for five minutes+n minutes). Note that "n" indicates the number of times when the detected pressure of the suction pressure detection section (81) continues to be lower than the predetermined value for the predetermined time T1 after the compressor startup section (84) has first started up the first non-inverter compressor (2B) (hereinafter, referred to as "the number of operating times of the low-pressure sensor (76)"). In short, each time the number of operating times of the low-pressure sensor (76) increases after the first startup of the first non-inverter compressor (2B) by the compressor startup section (84), the predetermined time T2 is extended in increments of one minute.

Note that the predetermined time T1 (ten seconds), the predetermined time T2 (five minutes) and the extended time (one minute) are not limited to these values and can be appropriately selected. Further, the predetermined time T1 may not be given. In this case, immediately after the detected pressure of the suction pressure detection section (81) becomes below the predetermined value, the command holding section (82) holds the switching command.

—Operational Behavior—

Next, a description will be given of the operational behavior of the refrigeration system (1). In this embodiment, a "cooling and refrigeration operation" is carried out for concurrently performing the room cooling of the indoor unit (1B) and the refrigeration of the chilling unit (1C) and the freezing unit (1D). This cooling and refrigeration operation is designed to be switchable between a first operation in which the first non-inverter compressor (2B) is used for the cooling system and a second operation in which the first non-inverter compressor (2B) is used for the air-conditioning system.

<First Operation>

Figure 4:
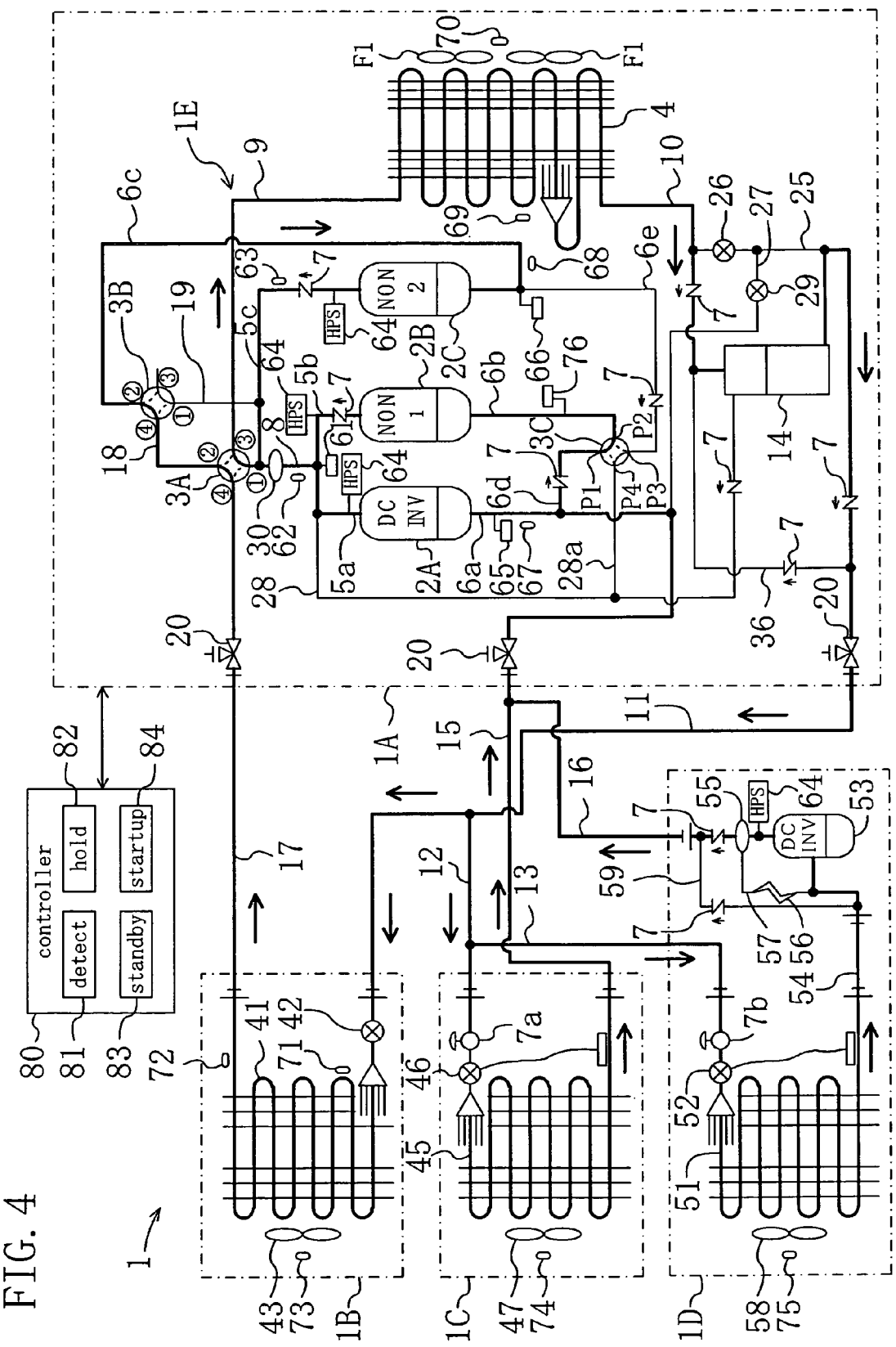
FIG. 4 is a piping diagram showing a refrigerant flow during a first operation of the refrigeration system.

In the first operation, as shown in FIG. 4, the inverter compressor (2A), the first non-inverter compressor (2B) and the second non-inverter compressor (2C) are driven and the booster compressor (53) is also driven.

The first four-way selector valve (3A), the second four-way selector valve (3B) and the third four-way selector valve (3C) are set to respective first positions. The solenoid valves (7a, 7b) in the chilling unit (1C) and the freezing unit (1D) are selected open, while the outdoor expansion valve (26) is selected closed. The electronic expansion valve (29) in the liquid injection pipe (27) is controlled on its opening to supply a predetermined flow rate of liquid refrigerant to the suction sides of the inverter compressor (2A) and the first non-inverter compressor (2B).

Under the above conditions, flows of refrigerant discharged from the inverter compressor (2A), the first non-inverter compressor (2B) and the second non-inverter compressor (2C) are combined together in the high-pressure gas pipe (8), flow through the first four-way selector valve (3A) and then the outdoor gas pipe (9) and condenses in the outdoor heat exchanger (4). The liquid refrigerant obtained by the condensation flows through the outdoor liquid pipe (10) and then the receiver (14) into the connecting liquid pipe (11).

Part of the liquid refrigerant in the connecting liquid pipe (11) flows into the first branch liquid pipe (12) and the rest flows into the indoor unit (1B). In the indoor unit (1B), the liquid refrigerant passes through the indoor expansion valve (42) and evaporates in the indoor heat exchanger (41) to cool the store. The gas refrigerant obtained by the evaporation flows through the first connecting gas pipe (17) into the outdoor unit (1A), passes through the first four-way selector valve (3A) and the second four-way selector valve (3B), flows through the suction pipe (6c) and then returns to the second non-inverter compressor (2C).

On the other hand, part of the liquid refrigerant having flowed into the first branch liquid pipe (12) flows through the second branch liquid pipe (13) and then into the freezing unit (1D) and the rest flows into the chilling unit (1C). In the chilling unit (1C), the liquid refrigerant passes through the chilling expansion valve (46) and then evaporates in the chilling heat exchanger (45) to cool the inside of the cold-storage display case. Thereafter, the gas refrigerant obtained by the evaporation flows through the second connecting gas pipe (15). In the freezing unit (1D), the liquid refrigerant passes through the freezing expansion valve (52) and then evaporates in the freezing heat exchanger (51) to cool the inside of the freezer display case. The gas refrigerant obtained by the evaporation is compressed by the booster compressor (53), passes through the branch gas pipe (16) and is then combined, in the second connecting gas pipe (15), with the gas refrigerant coming from the chilling unit (1C). The gas refrigerant combined in the second connecting gas pipe (15) flows into the outdoor unit (1A). Then, part thereof returns through the suction pipe (6a) to the inverter compressor (2A) while the rest flows through the branch pipe (6d) branched from the suction pipe (6a) and the third four-way selector valve (3C) and then returns through the suction pipe (6b) to the first non-inverter compressor (2B).

<Second Operation>

Figure 5:
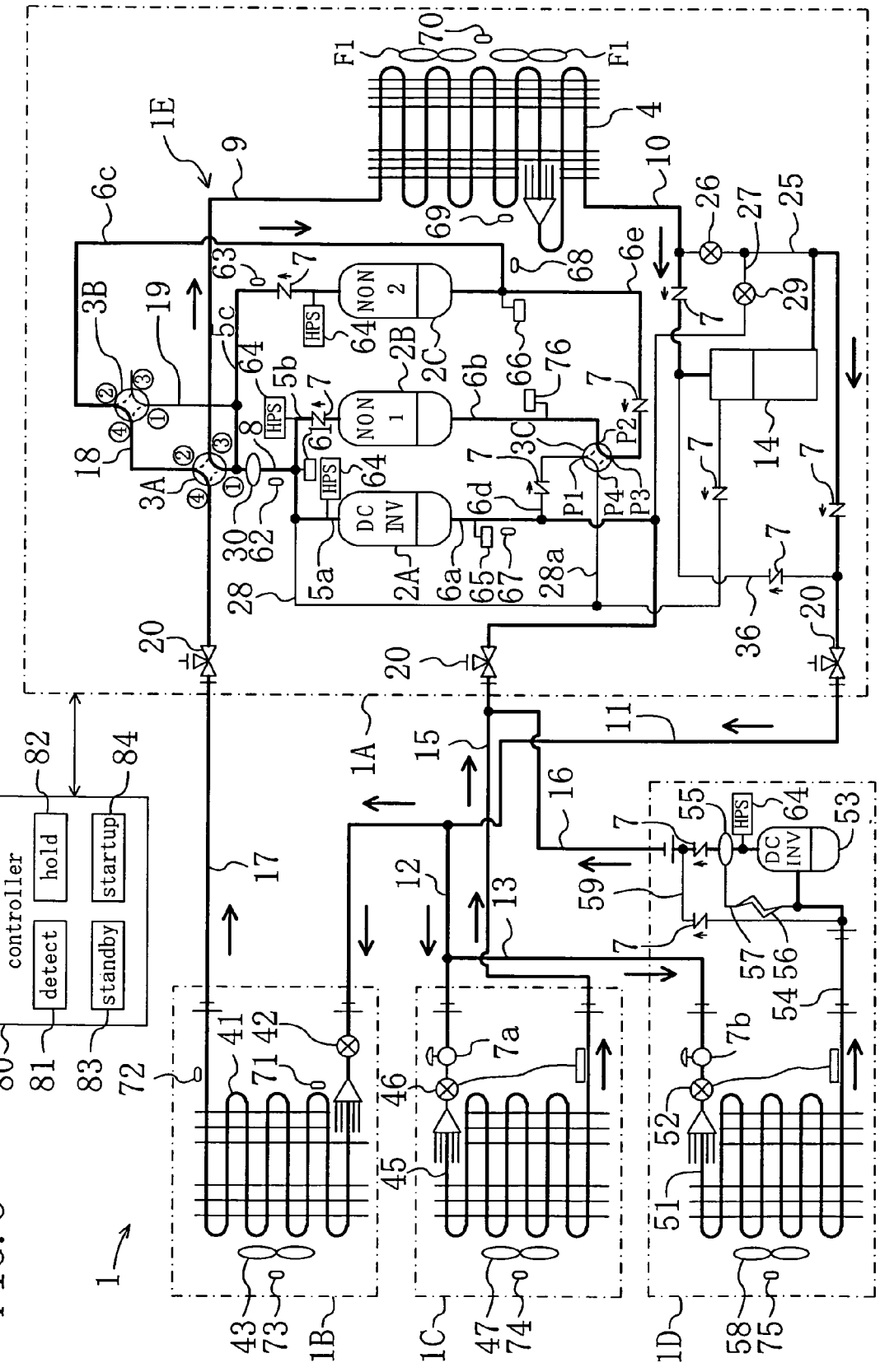
FIG. 5 is a piping diagram showing a refrigerant flow during a second operation of the refrigeration system.

The second operation is an operation when the indoor unit (1B) lacks the cooling capacity during the first operation and an operation in which the first non-inverter compressor (2B) is switched to the air-conditioning system. The setting of the components during the second operation is, as shown in FIG. 5, basically the same as but different from during the first operation in that the third four-way selector valve (3C) is switched to the second position.

Therefore, also during the second operation, like the first operation, refrigerant discharged from the inverter compressor (2A), the first non-inverter compressor (2B) and the second non-inverter compressor (2C) condenses in the outdoor heat exchanger (4) and evaporates in the indoor heat exchanger (41), the chilling heat exchanger (45) and the freezing heat exchanger (51).

Then, the gas refrigerant obtained by the evaporation in the chilling heat exchanger (45) and the freezing heat exchanger (51) returns through the suction pipe (6a) to the inverter compressor (2A). On the other hand, part of the refrigerant evaporated in the indoor heat exchanger (41) returns through the suction pipe (6c) to the second non-inverter compressor (2C), and the rest flows through the branch pipe (6e) branched from the suction pipe (6c) and the third four-way selector valve (3C) and then returns through the suction pipe (6b) to the first non-inverter compressor (2B). In this manner, two compressors, i.e., the first non-inverter compressor (2B) and the second non-inverter compressor (2C), are used for the air-conditioning system to fill up the lack of cooling capacity.

<Switching Control from First to Second Operation>

Figure 6:
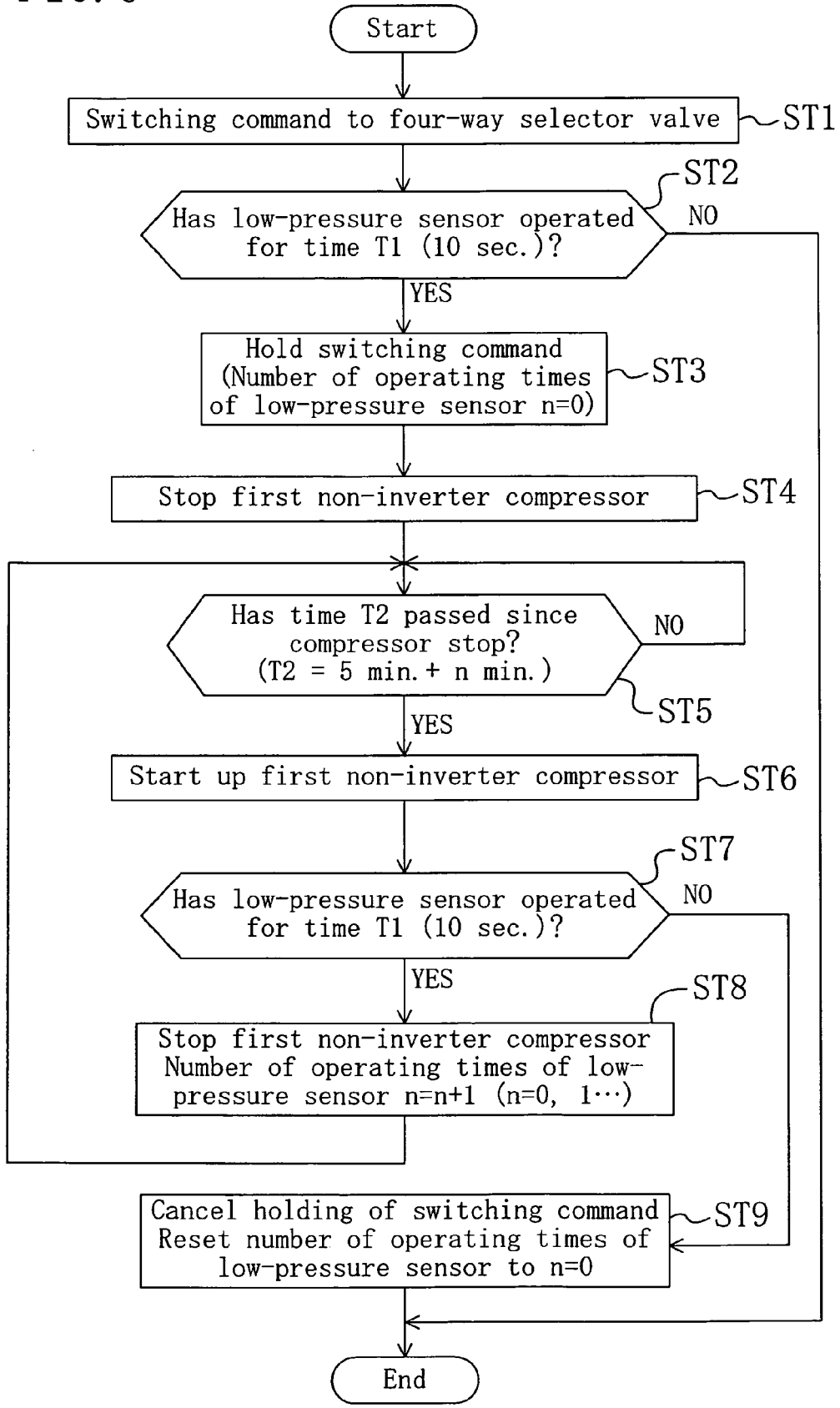
FIG. 6 is a flowchart showing switching control on the third four-way selector valve.

Next, a description is given of the control on switching from the first operation to the second operation by switching the third four-way selector valve (3C) from the first position to the second position with reference to FIG. 6. The third four-way selector valve (3C) is here referred to simply as a "four-way selector valve".

First, when in step ST1 a switching command to the four-way selector valve is issued by the controller (80), the control proceeds to step ST2. Specifically, in step ST1, the pilot valve (109) for the four-way selector valve is energized (ON) to switch the pilot valve (109) from the second position to the first position.

In step ST2, it is determined by the command holding section (82) whether or not the detected pressure of the suction pressure detection section (81) continues to be lower than the predetermined value for ten seconds. If the detected pressure continues to be lower than the predetermined value, it is determined that the four-way selector valves has malfunctioned, i.e., that it has not yet been normally switched to the second position, and the control proceeds to step ST3. On the other hand, if the detected pressure is not lower than the predetermined value, it is determined that the four-way selector valves has been normally switched to the second position and the control ends.

Figure 7:
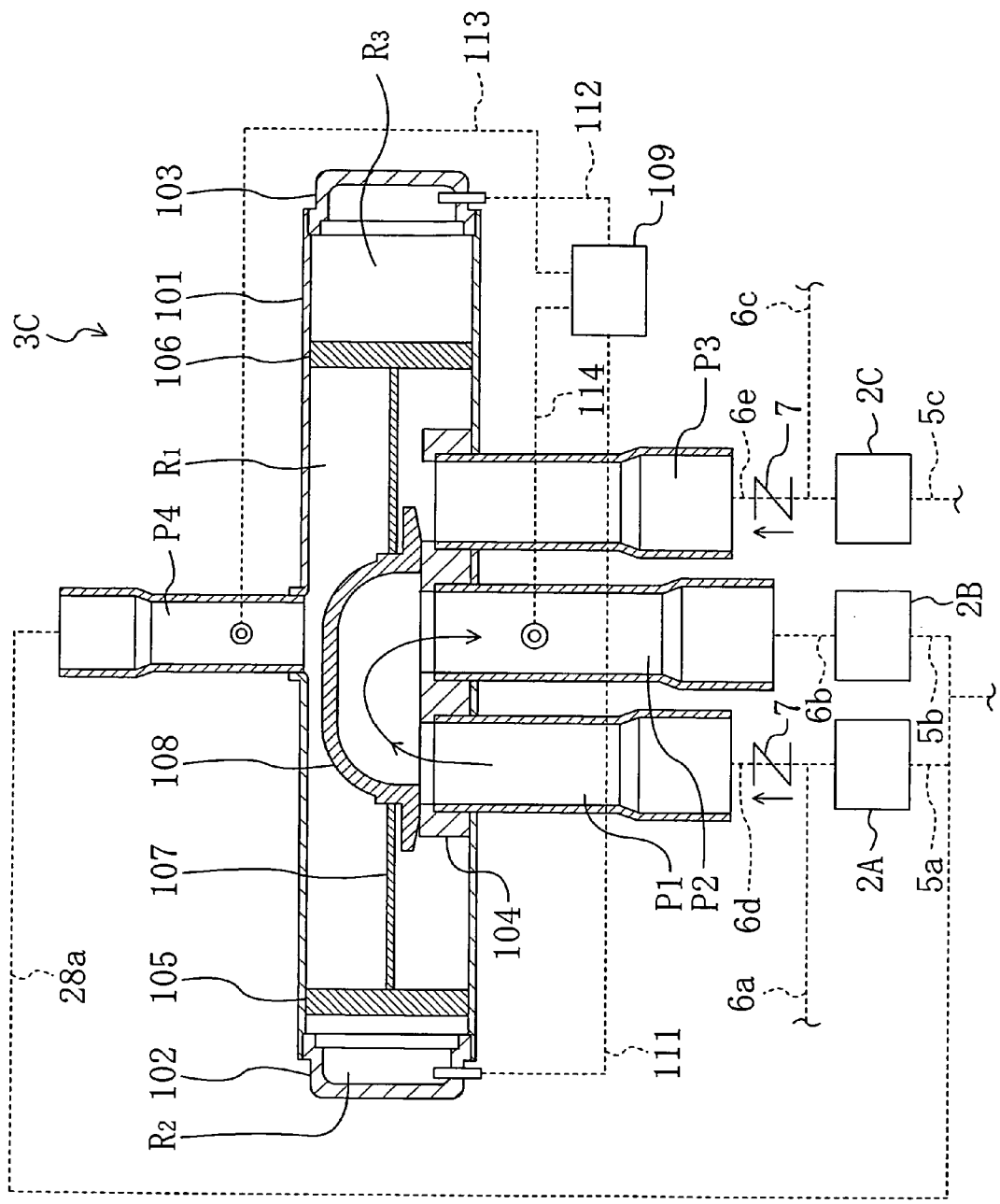
FIG. 7 is a diagram showing a malfunctioned condition of the third four-way selector valve.

Here, a description is given of a state that the detected pressure of the suction pressure detection section (81) drops. Where the four-way selector valve is in the first position, gas refrigerant resides in the high pressure room (R1) and the second working room (R3). Thus, part of the gas refrigerant is cooled by low-temperature gas refrigerant flowing inside of the valve element (108) to condense. Therefore, when the pilot valve (109) is switched to the first position, high pressure acts on the first working room (R2) and low pressure acts on the second working room (R3), so that the pressure difference between both the working rooms (R2, R3) causes the valve element (108) to be pressed toward the second working room (R3). During the time, however, the liquid refrigerant obtained by the condensation does not immediately flow out of the high pressure room (R1). Therefore, for example, as shown in FIG. 7, the valve element (108) stops on the way toward the second working room (R3). In this case, since the flow passage from the first port (P1) into the valve element (108) is narrowed, the amount of refrigerant flowing into the first non-inverter compressor (2B) is decreased, which drops the suction pressure.

In step ST3, the command holding section (82) holds the switching command to the four-way selector valve as it is, so that the pilot valve (108) is held in the first position. In other words, the valve element (108) of the four-way selector valve continues to be pushed toward the second working room (R3). At this point of time, it is recognized that the number of operating times of the low-pressure sensor (76) is n=0. When in step ST3 the switching command is held, the control proceeds to step ST4, wherein the compressor standby section (83) stops the first non-inverter compressor (2B) and puts it into standby. This prevents breakage of the first non-inverter compressor (2B) due to extreme drop in the suction pressure. Further, though the stop of the first non-inverter compressor (2B) slightly increases the low pressure acting on the second working room (R3) and thereby reduces the pressure difference between both the working rooms (R2, R3), even the reduced pressure difference causes the valve element (108) to be still pushed toward the second working room (R3).

When in step ST4 the first non-inverter compressor (2B) stops, the control proceeds to step ST5, wherein it is determined whether or not the predetermined time T2 (five minutes=five minutes+zero minutes) has passed since the stop of the first non-inverter compressor (2B). If the predetermined time T2 has not passed, the first non-inverter compressor (2B) stands by as it is. If the predetermined time T2 has passed, the control proceeds to step ST6. During the predetermined time T2, the valve element (108) of the four-way selector valve gradually slides toward the second working room (R3) due to the pressure difference between both the working rooms (R2, R3) to switch to the second position while the first non-inverter compressor (2B) is protected.

In step ST6, the first non-inverter compressor (2B) is started up by the compressor startup section (84). By the startup, low pressure acts again on the second working room (R3) of the four-way selector valve so that the pressure difference between both the working rooms (R2, R3) is increased. As a result, the valve element (108) is pushed further toward the second working room (R3). Therefore, in step ST6, the valve element (108) can surely be switched to the second position.

When in step ST6 the first non-inverter compressor (2B) starts up, the control proceeds to step ST7, wherein it is determined by the command holing section (82) whether or not the detected pressure of the suction pressure detection section (81) continues to be lower than the predetermined value for ten seconds. If the detected pressure continues to be lower than it, it is determined that the four-way selector valve has not yet been switched to the second position and the control proceeds to step ST8. On the other hand, if the detected pressure is not lower than it, it is determined that the four-way selector vale has been normally switched to the second position and the control proceeds to step ST9. In step ST9, the holding of the switching command to the four-way selector valve is cancelled by the command holding section (82), the number of operating times of the low-pressure sensor (76) is reset to n=0 and the control ends. Since in this manner the holding of the switching command is cancelled, the switching of the four-way selector valve for the next time can be carried out as usual.

In step ST8, the first non-inverter compressor (2B) is stopped and put into standby by the compressor standby section (83) and the control returns to step ST5. At the time, the number of operating times of the low-pressure sensor (76) is counted up so that it is recognized as n=1. In step ST5, it is determined whether or not the predetermined time T2 (six minutes=five minutes+one minute) has passed since the stop of the first non-inverter compressor (2B). If the predetermined time T2 has not passed, the first non-inverter compressor (2B) stands by as it is. If the predetermined time T2 has passed, the control proceeds to step ST6 as described above. In other words, since in step ST5 the number of operating times of the low-pressure sensor (76) is n=1, this means that the standby time of the first non-inverter compressor (2B) is extended one minute. Therefore, if the control returns again to step ST5, the number of operating times of the low-pressure sensor (76) is recognized as n=2. In this case, it is determined whether or not the predetermined time T2 (seven minutes=five minutes+two minutes) has passed since the stop of the first non-inverter compressor (2B).

If the procedure from step ST5 to step ST8 is repeated in the above manner, the standby time of the first non-inverter compressor (2B) is extended. Therefore, the four-way selector valve can be normally switched to the second position with higher reliability. Though in the present embodiment a description is given of the switching control from the first operation to the second operation, the control of the present invention is likewise applicable also to the switching from the second operation to the first operation.

Effects of Embodiment

As described so far, the present embodiment is directed to the refrigeration system (1) in which the first non-inverter compressor (2B) is used as a backup compressor for the inverter compressor (2A) or the second non-inverter compressor (2C) by the switching of the third four-way selector valve (3C) and whether the third four-way selector valve (3C) has malfunctioned is determined by the detection of the suction pressure of the first non-inverter compressor (2B) during switching of the third four-way selector valve (3C). Therefore, the operating condition of the third four-way selector valve (3C) can be recognized. Thus, suitable measures can be taken against malfunctions of the third four-way selector valve (3C).

Particularly, when the suction pressure of the first non-inverter compressor (2B) continues to be lower than the predetermined value for the predetermined time T1 (ten seconds), it is determined that the third four-way selector valve (3C) has malfunctioned. Therefore, as compared to the case where the third four-way selector valve (3C) is determined to have malfunctioned immediately after the suction pressure becomes below the predetermined value, the operating condition can be surely recognized without depending upon improper operating signals of the low-pressure sensor (76) that is a sensor for the suction pressure.

Since as a measure against the above malfunction the switching command to the third four-way selector valve (3C) is held, i.e., the third four-way selector valve (3C) is held in a pressure condition for switching it, the third four-way selector valve (3C) can be gradually switched while keeping the pressure.

Further, since the switching command is held and the first non-inverter compressor (2B) is stopped and put into standby for the predetermined time T2, this prevents breakage due to extreme drop in the suction pressure. Therefore, the third four-way selector valve (3C) can be switched during the predetermined time T2 while the first non-inverter compressor (2B) is protected.

Furthermore, since after the passage of the predetermined time T2 the first non-inverter compressor (2B) is started up and whether the third four-way selector valve (3C) has malfunctioned is determined again based on the suction pressure, the pressure for switching the third four-way selector valve (3C) can be positively increased. Thus, even if the third four-way selector valve (3C) is not completely switched during standby of the first non-inverter compressor (2B), it can be surely switched.

Furthermore, each time the third four-way selector valve (3C) is determined again to have malfunctioned based on the suction pressure during startup of the first non-inverter compressor (2B), the standby time of the first non-inverter compressor (2B) is extended. Therefore, the third four-way selector valve (3C) can be surely switched during the standby. In other words, it can be inferred that as the number of times when the third four-way selector valve (3C) is determined to have malfunctioned increases, the suction pressure of the first non-inverter compressor (2B) extremely has dropped. However, the suction pressure can be gradually increased to recover it.

Other Embodiments

The above embodiments of the present invention may have the following configurations.

For example, though in the above embodiment the compressor standby section (83) extends the standby time (predetermined time T2) of the first non-inverter compressor (2B) according to the number of operating times of the low-pressure sensor (76), it may be configured to allow the first non-inverter compressor (2B) to repeatedly stand by for a constant predetermined time without extending the predetermined time T2.

Furthermore, the compressor startup section (84) may be dispensed with. In other words, step ST6 to step ST8 may be omitted in the above-described control flow: if in step ST5 the predetermined time T2 has passed, the control may proceed to step ST9 wherein the holding of the switching command is cancelled to start up the first non-inverter compressor (2B) and return it to the normal operation. In this case, in step ST9, the reset of the number of operating times of the low-pressure sensor (76) is omitted.

Though in the above embodiment only three compressors (2A, 2B, 2C) are provided, an additional compressor used solely for the air-conditioning system or the cooling system may be provided, or another utilization side heat exchanger may be additionally provided with a compressor used solely therefor.

The above embodiments are merely preferred embodiments in nature and are not intended to limit the scope, applications and use of the invention.

INDUSTRIAL APPLICABILITY

As seen from the above, the present invention is useful as a refrigeration system for performing capacity control by switchover among a plurality of compressors.

The invention claimed is:

1. A refrigeration system comprising:
a refrigerant circuit, including a four-way selector valve provided therein, for operating in a refrigeration cycle, the four-way selector valve having a first port for allowing only suction refrigerant for a first compressor to flow thereinto, a second port for allowing only suction refrigerant to flow out thereof toward a second compressor, a third port for allowing only suction refrigerant for a third compressor to flow thereinto, and a fourth port for allowing only discharge refrigerant from the first to third compressors to flow thereinto;
the four-way selector valve being configured to be switchable between a first position in which the first port is communicated with the second port and the third port is communicated with the fourth port and a second position in which the first port is communicated with the fourth port and the second port is communicated with the third port; and
determining means for detecting the suction pressure of the second compressor during switching of the four-way selector valve and thereby determining whether the four-way selector valve has malfunctioned.

2. A refrigeration system comprising:
a refrigerant circuit, including a four-way selector valve provided therein, for operating in a refrigeration cycle, the four-way selector valve having a first port for allowing only suction refrigerant for a first compressor to flow thereinto, a second port for allowing only suction refrigerant to flow out thereof toward a second compressor, a third port for allowing only suction refrigerant for a third compressor to flow therein to, and a fourth port for allowing only discharge refrigerant from the first to third compressors to flow therein to;
the four-way selector valve being configured to be switchable between a first position in which the first port is communicated with the second port and the third port is communicated with the fourth port and a second position in which the first port is communicated with the fourth port and the second port is communicated with the third port; and
determining means for detecting the suction pressure of the second compressor during switching of the four-way selector valve and thereby determining whether the four-way selector valve has malfunctioned,
wherein the determining means includes:
a suction pressure detection section for detecting the suction pressure of the second compressor after the issue of a switching command to the four-way selector valve;
a command holding section for, when the detected pressure of the suction pressure detection section becomes lower than a predetermined value, determining that the four-way selector valve has malfunctioned and holding the switching command; and
a compressor standby section for, upon the command holding section holding the switching command, stopping the second compressor and putting it into standby for a predetermined time.

3. The refrigeration system of claim 2, wherein
the determining means further includes a compressor startup section for starting up the second compressor put into standby for the predetermined time by the compressor standby section, and
wherein the compressor standby section is configured, when the detected pressure of the suction pressure detection section becomes lower than the predetermined value again during the startup according to the compressor startup section, to stop the second compressor and put it into standby for a period of time extended from the predetermined time.

\* \* \* \* \*

UNITED STATES PATENT AND TRADEMARK OFFICE
CERTIFICATE OF CORRECTION

PATENT NO.         : 7,765,817 B2
APPLICATION NO.    : 11/631859
DATED              : August 3, 2010
INVENTOR(S)        : Masaaki Takegami et al.

It is certified that error appears in the above-identified patent and that said Letters Patent is hereby corrected as shown below:

ON THE TITLE PAGE:

At item (73), Assignee, change:

"(73) Assignee: Daiken Industries, Ltd., Osaka (JP)"

to

--(73) Assignee: Daikin Industries, Ltd., Osaka (JP)--.

Signed and Sealed this
Twenty-sixth Day of April, 2011

David J. Kappos
*Director of the United States Patent and Trademark Office*